United States Patent
Rankin

(10) Patent No.: US 6,778,826 B2
(45) Date of Patent: Aug. 17, 2004

(54) USER PROFILING COMMUNICATIONS SYSTEM

(75) Inventor: Paul J. Rankin, Horley (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 497 days.

(21) Appl. No.: 09/833,444

(22) Filed: Apr. 12, 2001

(65) Prior Publication Data
US 2003/0207685 A1 Nov. 6, 2003

(30) Foreign Application Priority Data
Apr. 15, 2000 (GB) ................................. 0009249

(51) Int. Cl.⁷ ............................................ H04Q 7/20
(52) U.S. Cl. .................................. 455/433; 455/517
(58) Field of Search ................. 455/433, 418–420, 455/552.1, 556.1, 517, 502; 725/98, 118, 109, 110, 81

(56) References Cited

U.S. PATENT DOCUMENTS

| | | | |
|---|---|---|---|
| 4,173,016 A | 10/1979 | Dickson | |
| 4,816,904 A | 3/1989 | McKenna et al. | 358/84 |
| 5,710,605 A | 1/1998 | Nelson | |
| 5,808,694 A | 9/1998 | Usui et al. | |
| 5,835,861 A | 11/1998 | Whiteside | |
| 5,887,062 A * | 3/1999 | Maeda et al. | 380/234 |
| 6,195,548 B1 * | 2/2001 | Schultheiss | 455/419 |
| 6,208,335 B1 * | 3/2001 | Gordon et al. | 345/721 |
| 6,418,324 B1 * | 7/2002 | Doviak et al. | 455/426.1 |
| 6,529,706 B1 * | 3/2003 | Mitchell | 455/12.1 |
| 6,665,303 B1 * | 12/2003 | Saito et al. | 370/401 |
| 6,738,981 B1 * | 5/2004 | Tonnby et al. | 725/98 |

FOREIGN PATENT DOCUMENTS

| | | | | |
|---|---|---|---|---|
| EP | 0804030 A2 | 4/1997 | | H04N/7/14 |
| EP | 0 944 002 | * 9/1999 | | G06F/17/00 |
| EP | 0944003 | 9/1999 | | |
| EP | 0944004 | 9/1999 | | |
| WO | WO9903034 | 1/1999 | | |
| WO | WO 99/33293 | * 7/1999 | | H04Q/7/22 |
| WO | WO9959334 | 11/1999 | | |

* cited by examiner

Primary Examiner—William Trost
Assistant Examiner—Brandon Miller

(57) ABSTRACT

In a networked communications apparatus, comprising at least one server (10) and a plurality of user stations (12) coupled via a first network (14), storage means (16) hold a profile database containing data representing a characteristic behaviour of an associated user. The user station further comprises a portable communications device (18) connectable to the said at least one server (10) via a second network (22), with the means for automatically acquiring user data storing access data for establishing a connection via said second network with the associated user terminal network address or addresses.

18 Claims, 2 Drawing Sheets

USER PROFILING COMMUNICATIONS SYSTEM

The present invention relates to methods and apparatuses for delivering data to a user and, in particular, to systems where such data is selected from a larger store automatically and on the basis of a compiled profile of the user.

An example of such a system is described in European patent application EP-A-0 944 002 which provides a communications method and a communications network comprising a server and a plurality of user terminals. The user terminals can share information with each other and with the server by means of an interconnecting network, especially the Internet. On the server, a profile database is provided containing data representing a characteristic behaviour of associated user addresses. The server automatically acquires this representative data in response to activities performed by the associated users of the network, which data is stored with the associated user addresses in the profile database on the server.

The particular concern with the system of EP-A-0 944 002 is to avoid an incorrect or inappropriate profile specification being built up for a user and, to this end, the described profile database can be accessed by the user at any time such that the user can modify the content of the database in relation to the contents associated with one of the addresses associated with that user. The user can modify the contents by, for example, adding, deleting, or amending subject matter in the profile database.

Whilst user profiling can increase the user-friendliness of the system as perceived by the user, the accommodations required in terms of additional data channels to storage and data collation utilities within the server may make the provision of user-profiling or user tailoring of services an unjustified excess.

It is accordingly an object of the present invention to provide some means whereby the user-perceived enhanced system functionality arising from user profiling does not require excessive system communications resources.

In accordance with a first aspect of the present invention, there is provided a networked communications apparatus comprising at least one server and a plurality of user stations, wherein the user stations comprise terminals arranged to receive information from the at least one server by means of a connection via a first network, the apparatus further comprising:

storage means holding a profile database, which profile database contains data representing a characteristic behaviour of an associated user terminal network address or addresses, the apparatus including means for automatically acquiring such data in response to an activity of the associated user and storing the same together with the associated user terminal network address or addresses in the profile database;

wherein the user station further comprises a portable communications device coupled with said terminal and connectable to said at least one server via a second network, and in that the means for automatically acquiring user data stores access data for establishing a connection via said second network with the associated user terminal network address or addresses. By use of the portable communications device link for the transfer of user profiling data, traffic on the first network (which may be the Internet or some more localised Intranet) is kept to within manageable levels such that the user does not associate advanced profiling functionality with system delays.

The portable communications device may suitably comprise a mobile telephone (the second network being a telecommunications network), and the said access data for establishing a connection may therefore comprise a telephone number. The above-referenced first network may be the Internet and the user terminals may accordingly comprise at least a display device coupled with processing means hosting an Internet browser and user-operable means for control of the same. With such an arrangement, one or more of the said terminals may comprise a television receiver further configured to access and display data from the World Wide Web.

In one embodiment, the coupling between the portable communications device and the respective user terminal may comprise a wireless link. Additionally, the aforementioned data transfer via said wireless link preferably follows a predetermined set of message transfer protocols, such as those known generically as "Bluetooth".

The portable communications device may further comprise a buffer arranged to store data received from said server and addressed to the respective user terminal and, in such circumstances, may further comprise means for reading stored data from said buffer and sending said data on to the user terminal. In such an arrangement, the portable communications device may further comprise means configured to determine whether a respective user terminal is available to receive data from the said server and, if so, to forward such data and, if not, to buffer such data until such time as either the respective user terminal becomes available or the buffer becomes full.

In an arrangement as aforesaid, said portable communications device may further comprise means configured to determine whether said server is available to receive data from a respective user terminal and, if so, to forward such data and, if not, to buffer such data until such time as either the server becomes available or the buffer becomes full.

The user terminal may be configured for the automatic acquisition of data for the profile database, with said data being transferred to said server via said mobile communications device following establishment of a connection via said second network. Additionally, the coupling with said user terminal may be by wireless transmission therefrom, and the portable communications device means for receiving wireless transmissions from the terminal may be further configured to receive additional data transmitted wirelessly from other sources.

Also in accordance with the present invention, there is provided a portable communications apparatus for use in a system as described hereinabove, a data processing apparatus having the technical features of a user terminal as recited above and including means for coupling, for transfer of data, with a communications apparatus described above.

According to a further aspect of the present invention, there is provided a method of data communication for use in a networked communications system comprising at least one server and a plurality of user stations, wherein the user stations comprise terminals which can receive information from the at least one server by means of a connection via a first network, the method comprising:

providing a profile database, which profile database contains data representing a characteristic behaviour of an associated user terminal network address or addresses, the data being acquired automatically in response to an activity of the associated user and being stored together with the associated user terminal network address or addresses in the profile database;

with the user station further comprising a portable communications device coupled with said terminal and connectable to said at least one server via a second network, the profile database may further be configured to access data for establishing connection via said second network with the associated user terminal network address or addresses.

The said communications device may comprise a mobile telephone and the above-mentioned stored access data for establishing connection may correspondingly comprise a telephone number for said mobile telephone. Under such circumstances, the portable communications device may be configured to store data received from said server and addressed to the respective user terminal, and the buffer may hold or buffer such data until such time as either the respective user terminal becomes available or the buffer becomes full.

Further features and advantages of the present invention will become apparent from reading of the following description of preferred embodiments, given by way of example only, and with reference to the accompanying drawings, in which.

Figure 1:
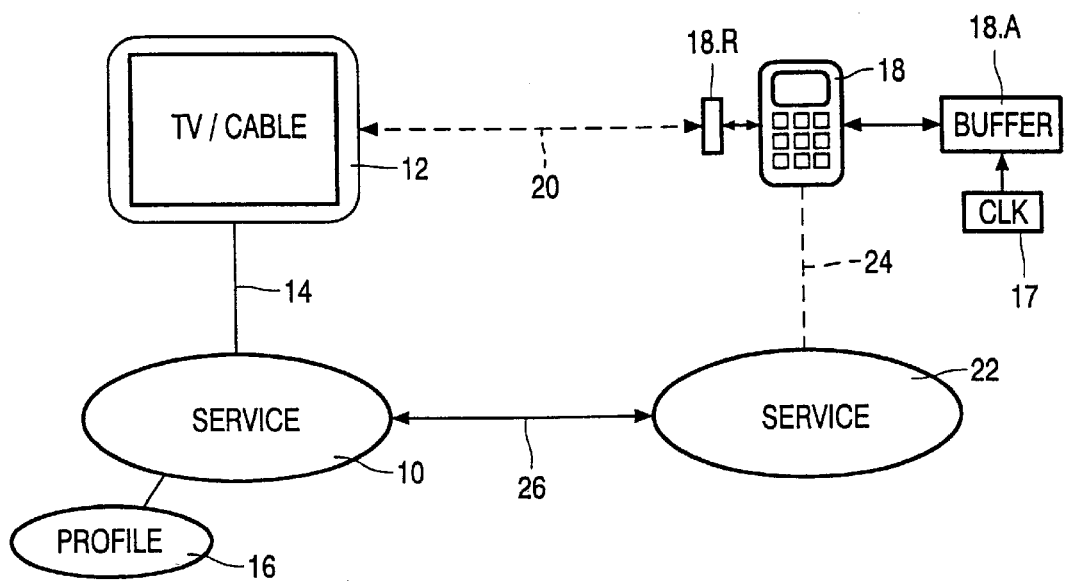
FIG. 1 represents a coupled arrangement of user terminal and portable communications device.

FIG. 1 schematically represents components embodying the present invention and in the form of a networked communications apparatus comprising at least one server or service provider 10 coupled to a plurality of user stations 12 (only one of which is shown) via a link 14 which may comprise a network connection, wireless or cable link, or other data transfer means. The server 10 includes at least one storage means 16 holding a profile database, which profile database contains data representing a characteristic behaviour of an associated user as identified by their terminal network address or addresses. The server builds up the user profile data by automatically acquiring such data in response to one or several selected activities of the associated user, such as what television channels they watch, what goods they purchase on-line and so forth. This profiling data is then stored together with the associated user terminal network address or addresses in the profile database.

The user station further comprises a portable communications device 18, suitably a mobile telephone, coupled with said terminal 12 as indicated by dashed link 20. As schematically illustrated, the device 18 includes a receiver 18.R configured to the form of coupling with terminal 12, as well as a buffer 18.A for received signals. The device is connectable to said at least one server or service provider 22 via a second network or data link 24, in this case a telecommunications network. As shown by line 26, the means for automatically acquiring user data (server 10) is coupled to the telecommunications service 22 and may use this channel via link 20 as a simple low-cost route for user profiling data being gathered from or by the user terminal 12 or as a back channel for other data required to be sent by said terminal 12 back to server 10. In order to facilitate this connection, the service provider 10 need simply store the users mobile telephone number with the profiling data for that user in the profile database 16. By use of the portable communications device link for the transfer of user profiling data, traffic on the first network or link 14 is kept to within manageable levels such that the user does not associate advanced profiling functionality with system delays.

The link 20 between the portable communications device 18 and the respective user terminal 12 may comprise a wireless (radio frequency or infrared) link. Additionally, the aforementioned data transfer via said wireless link preferably follows a predetermined set of message transfer protocols, such as those known generically as "Bluetooth". The support for link 18 further enables interaction with a beacon infrastructure where a system of beacons transmit additional data messages to a users portable communications device 18. The beacons provide matrix coverage over a series of locales.

Figure 2:
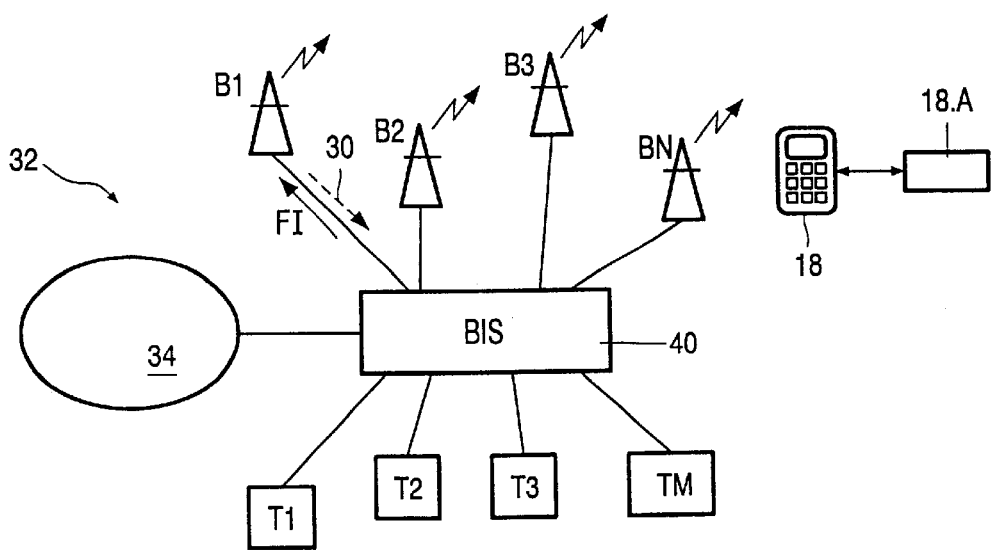
FIG. 2 represents an exemplary implementation of messaging beacon infrastructure.

Whilst base stations or beacons will typically be independent of one another (in a shopping mall set up, each shop provides and maintains its own beacon without reference to any beacons provided by neighbouring shops), the beacons may be wholly or partially networked with at least some coordination as to their broadcast messages. FIG. 2 is a diagram of such a system 32 of linked beacons embodying the invention and providing an implementation of an infrastructure for use in, for example, department stores, shopping malls, theme parks, etc. The system 32 comprises a plurality of beacons B1, B2, B3, BN distributed over a series of locales. Each of the beacons B1–BN broadcasts one or more short-range inquiry signals in a timeslot format. The beacons B1–BN are controlled by a beacon infrastructure server (BIS) 40, with one or more terminals T1, T2, T3, TM being connected to the server 40. The terminals T1–TM enable service providers, i.e., the users of beacons B1–BN, to author or edit allocated service slots in the form of added data piggy backed on inquiry facilitation signals transmitted by beacons B1–BN. A service provider may lease a beacon or one of the beacon's service slots from the infrastructure provider. To this end, server 40 provides simple HTML templates for filling out by the user via one of terminals T1–TM. Having filled out the template with, for example, a description of the service and other information for the data to be carried via the beacon broadcast, the template is returned to server 40, preferably via a secure link using, e.g., Secure HTTP (S-HTTP) or Secure Sockets Layer (SSL). SSL creates a secure link between a client and a server, over which any amount of data can be sent securely. S-HTTP is designed to transmit individual messages securely. Server 40 then creates the appropriate additional data package FI for appending to the inquiry signal of a relevant one of the beacons B1–BN based on the information submitted with the template. The system 32 may further comprise a beacon website hosted by an application server 34 to assist in carrying out various functions, as will be readily understood by the skilled reader.

Whilst it is expected that the messages will simply be broadcast to whichever mobile devices 18 are within range of a given terminal (with the user then being able to view the message data on the mobile device), response messages sent by the mobile device back to the broadcasting beacon may be supported, as indicated by dashed line 30. In one preferred embodiment, the mobile device 18 is provided with a buffer (18.A) to build up a log of received messages (optionally time-stamping them on receipt—for which purpose a clock signal source 17 may be provided) which messages can then be studied, perhaps edited on the mobile by use of the device keys, and replied to—for example if containing URL's—at the users leisure. With the buffer, the viewing and responding of messages may be handled by other devices of the user with the captured log being downloaded (e.g. via link 20) when the user is back in the vicinity of these devices.

Figure 3:
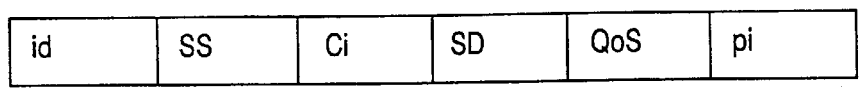
FIG. 3 represents a message format for transmission in a beacon slot in the arrangement of FIG. 2.

Services may rent beacon slots from an infrastructure provider, and a typical message form, shown in FIG. 3, might comprise:

id an identifier for the transmitting beacon
SS an identifier for the Service Supplier
Ci specification of the Service Class
SD (optionally) further service details
QoS specification of Quality of Service
pi one or more connection pointers.

The connection pointers pi may be prefixed by a pointer type (eg. SMS, 1-800-#, url). One service may have alternative pointers for the mobile to activate the service connection. Various qualities of service QoS may be supported by the same service provider, e.g. SMS, Audio interaction, GPRS, WAP etc. These should also be matched against the users preferences, mobile platform options, and cost preferences.

Figure 4:
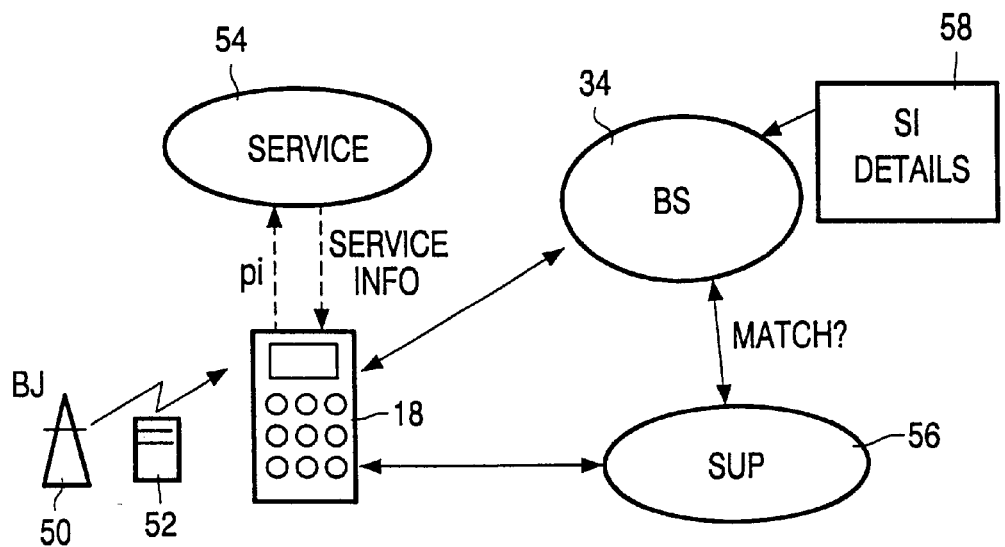
FIG. 4 shows the transmission of messaging slots from a beacon to a mobile device.

As represented by FIG. 4, each beacon 50 emits, in pulsed mode, a frame 52 of barcode slots offering connection "bridges" i.e. data enabling or supporting connection to various local services. The frame 52 is received by mobile device 18 with a connection pointer pi being used to initiate a service from service provider 54: the service may comprise a telecommunications or web-based service or some other arrangement for information delivery dependent on the capabilities of the mobile device 18. Prior to service activation by service provider 54 with a selected quality of service QoS, a negotiation or comparison process occurs between the stored user profile SUP (held in storage at 56) and characteristics of the service class as specified by Ci to optimise the selection of service class and QoS. The chosen QoS should fit the user's context, and acceptable charging rate. Therefore different QoS specifications may have different priorities at different times of the user's day.

Before using pointer pi to activate the service connection si from provider 54 (which may be made over GSM cellnet, SMS, or even over the wireless link 20, optionally following bluetooth protocols) the class Ci (and possibly further details, e.g. QoS) is compared with current subset of the user profile, SUP. The physical location for storage 56 holding the SUP may be on the mobile (e.g. as a table), or remotely on a web site owned by the user, or provided by the beacon infrastructure provider for end users. The first stages of correlating class Ci and further service details against the SUP are preferably automatic. These may happen even before the user is notified by the mobile of the presence of a link to that service.

If a service of class Ci matches a table of classes held on the mobile device 18, then in a first option the user is alerted and may with a single key press on the mobile 18 activate the service pointer pi. In an alternative arrangement, the mobile 18 first automatically issues (e.g. via SMS) a request to remote beacon website BS hosted by application server 34 for a more exact correlation between the services details (as held in local storage 58 by application server 34) and the stored SUP. If the service is deemed to match the user's current interest and intent, a positive answer is returned to the mobile 18 and only then is the user alerted by the mobile of the service's presence. The user then has the choice to activate the service automatically via its pointer pi being sent to service provider 54.

Figure 5:
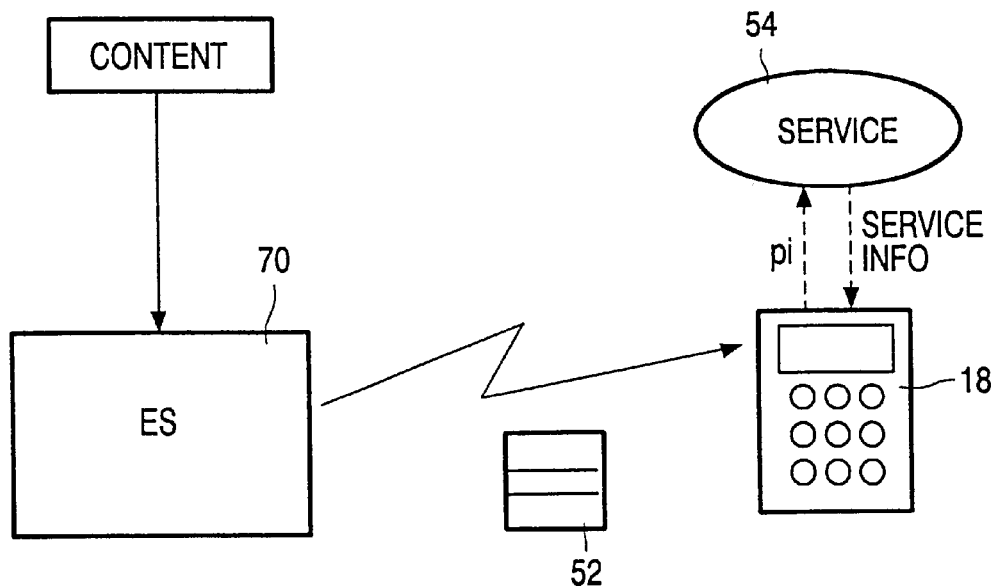
FIG. 5 represents a combined user terminal and portable communications device and its connection to different services.

FIG. 5 represents a further arrangement for TV or music-linked services, with an entertainment system ES 70 (TV, CD Player, MP3 jukebox or games platform for examples) being coupled via the mobile device 18 to the service provider 54 hosting, for example, Cellnet or web-based services.

As before, the frame broadcast by wireless link to the mobile may contain more than one service class, more than one pointer type pi per service offering different QoS and optionally more details of the services on offer.

In an extreme example, a service slot might only contain the identity of a music CD currently being played, plus a pointer pi (e.g. to a phone-based music service or web site) being pre-stored on the mobile. On activating the service via pi, the service is passed the identity of the CD from the beacon slot information, and the music service can be automatically tailored to the current CD.

Although defined principally in terms of a software-based or controlled implementation, the skilled reader will be well aware than many of the above-described functional features could equally well be implemented in hardware or a combination of software and hardware.

From reading the present disclosure, other modifications will be apparent to persons skilled in the art. Such modifications may involve other features which are already known in the design, manufacture and use of telecommunications systems and/or data network access apparatus and devices and component parts thereof and which may be used instead of or in addition to features already described herein.

What is claimed is:

1. A networked communications apparatus comprising a first server and a plurality of user stations, wherein the user stations comprise terminals arranged to receive information from the first server by means of a connection via a first network, the apparatus further comprising: storage means holding a profile database, which profile database contains data representing a characteristic behavior of an associated user terminal network address or addresses, the apparatus including means for automatically acquiring such data in response to an activity of the associated user and storing the same together with the associated user terminal network address or addresses in the profile database; wherein the user station further comprises a portable communications device coupled with said terminal via a first channel link and said portable communications device being connectable to said first server in a first path via said first channel link of said first network, and in a second path via a second server of a second channel link of a second network, and in that the means for automatically acquiring user data stores access data for establishing a connection via said second network with the associated user terminal network address or addresses, wherein the first server of said first network and the second server of said second network are coupled as a back channel to provide an alternate channel between the user station terminal and the portable communications device.

2. Apparatus as claimed in claim 1, wherein said portable communications device comprises a mobile telephone, said second network is a telecommunications network, and the said access data for establishing a connection comprises a telephone number.

3. Apparatus as claimed in claim 1, wherein the first network is the Internet and the user terminals comprise at least a display device coupled with processing means hosting an Internet browser and user-operable means for control of the same.

4. Apparatus as claimed in claim 3, wherein one or more of said terminals comprises a television receiver further configured to access and display data from the World Wide Web.

5. Apparatus as claimed in claim 1, wherein the first channel link that couples the portable communications device and the respective user terminal comprises a wireless link.

6. Apparatus as claimed in claim 5, wherein data transfer via said wireless link follows a predetermined set of message transfer protocols.

7. Apparatus as claimed in claim 1, wherein the portable communications device further comprises a buffer arranged to store data received from said first server and addressed to the respective user terminal, and means for reading stored data from said buffer and sending said data on to the user terminal.

8. An apparatus as claimed in claim 7, wherein said portable communications device further comprises means configured to determine whether a respective user terminal is available to receive data from said first server and, if so, to forward such data and, if not, to buffer such data until such time as either the respective user terminal becomes available or the buffer becomes full.

9. Apparatus as claimed in claim 7, wherein a said portable communications device further comprises means configured to determine whether said first server is available to receive data from a respective user terminal and, if so, to forward such data and, if not, to buffer such data until such time as either the first server becomes available or the buffer becomes full.

10. Apparatus as claimed in claim 1, wherein the or each said portable communications device further comprises the technical features of the respective user terminal.

11. Apparatus as claimed in claim 1, wherein said user terminal is configured for the automatic acquisition of data for the profile database, said data being transferred to said first server via said portable communications device following establishment of a connection via the second server of said second network.

12. Apparatus as claimed in claim 1, wherein the coupling with said user terminal by the first channel link is by wireless transmission therefrom, and the portable communications device means for receiving wireless transmissions from the terminal are further configured to receive additional data transmitted wireless from other sources.

13. A communications apparatus having the technical features of said portable communications device as recited in claim 1.

14. A data processing apparatus having the technical features of a user terminal as recited in claim 1 and further including means for coupling, for transferring data, with a communications apparatus as recited in claim 13.

15. A method of data communication for use in a networked communications system comprising a first server and a plurality of user stations, wherein the user stations comprise terminals which can receive information from the first server by means of a connection via a first network, the method comprising:

providing a profile database, which profile database contains data representing a characteristic behavior of an associated user terminal network address or addresses, the data being acquired automatically in response to an activity of the associated user and being stored together with the associated user terminal network address or addresses in the profile database; with the user station further comprising a portable communications device coupled with said terminal via a first channel link and said portable communications device being connectable to said first server in a first path via said first channel link of said first network, and in a second path via a second server of a second network, the profile database further stores access data for establishing connection via said second network with the associated user terminal network address or addresses, wherein the first server of said first network and the second server of said second network are coupled as a back channel to provide an alternate channel between the user station terminal and the portable communications device.

16. A method as claimed in claim 1, wherein said portable communications device comprises a mobile telephone and stored access data for establishing connection comprises a telephone number for said mobile telephone.

17. A method as claimed in claim 15, wherein said portable communications device is configured to store data received from said first server and addressed to the respective user terminal, and to buffer such data until such time as either the respective user terminal becomes available or the buffer becomes full.

18. A method as claimed in claim 15, wherein said portable communications device is configured to store data received from a one of said user terminals and addressed to the said first server, and to buffer such data until such time as either the said server becomes available or the buffer becomes full.

* * * * *